US007426546B2

(12) United States Patent
Breiter et al.

(10) Patent No.: US 7,426,546 B2
(45) Date of Patent: Sep. 16, 2008

(54) METHOD FOR SELECTING AN EDGE SERVER COMPUTER

(75) Inventors: Gerd Breiter, Wildberg (DE); Wilfried Bruegmann, Altdorf (DE); Bernhard Schmid, Sindelfingen (DE); Hendrik Wagner, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 10/474,972

(22) PCT Filed: Mar. 16, 2002

(86) PCT No.: PCT/EP02/02947

§ 371 (c)(1),
(2), (4) Date: Mar. 18, 2004

(87) PCT Pub. No.: WO02/084976

PCT Pub. Date: Oct. 24, 2002

(65) Prior Publication Data
US 2004/0148393 A1 Jul. 29, 2004

(30) Foreign Application Priority Data
Apr. 18, 2001 (EP) .................................. 01109563

(51) Int. Cl.
*G06F 15/16* (2006.01)
*G06F 15/173* (2006.01)
(52) U.S. Cl. ........................ 709/219; 709/203; 709/229; 709/232; 709/233; 709/234; 709/235; 709/241

(58) Field of Classification Search ................. 709/229, 709/203, 206, 219, 232–235
See application file for complete search history.

(56) References Cited

U.S. PATENT DOCUMENTS 6,038,599 A * 3/2000 Black et al. .................. 709/223

(Continued)

FOREIGN PATENT DOCUMENTS

JP 2001-007844 12/2001

(Continued)

OTHER PUBLICATIONS

P.M.E. De Bra et al., "Information Retrieval in the World-Wide Web: Making Client-Based Searching Feasible," *Computer Networks and ISDN Systems 27*, Nov. 1, 1994, pp. 183-192.

(Continued)

*Primary Examiner*—Glenton B. Burgess
*Assistant Examiner*—Philip J Chea
(74) *Attorney, Agent, or Firm*—Joseph E. Bracken; Winstead PC

(57) ABSTRACT

Media Distribution within the Internet is done with the help of Application-Servers, Content-Servers and distributed Edge Servers where the clients are connected to Media Distribution Services. A computer system is provided comprising a client having a Web browser with a media player, a Web Application Server, content Edge Servers ES1 to ES4 and a Media Request Broker. After the client has selected a media for streaming, the Media Request Broker makes a determination concerning an appropriate Edge Server to perform the streaming operation. This determination is made based on an extension of the client's http request made by the Edge Server and passed from the Application Server to the Media Request Broker.

2 Claims, 3 Drawing Sheets

U.S. PATENT DOCUMENTS

| | | | |
|---|---|---|---|
| 6,230,200 B1 * | 5/2001 | Forecast et al. | 709/226 |
| 6,327,622 B1 * | 12/2001 | Jindal et al. | 709/228 |
| 6,970,913 B1 * | 11/2005 | Albert et al. | 709/217 |
| 2002/0026511 A1 * | 2/2002 | Garcia-Luna-Aceves et al. | 709/226 |
| 2002/0152239 A1 * | 10/2002 | Bautista-Lloyd et al. | 707/513 |

FOREIGN PATENT DOCUMENTS

| | | |
|---|---|---|
| JP | 2002-530749 | 9/2002 |
| WO | WO 98/24208 | 6/1998 |
| WO | WO 00/29990 | 5/2000 |
| WO | WO 02/084976 | 10/2002 |

OTHER PUBLICATIONS

Antoine Mourad et al., "Scalable Web Server Architectures," *Proceedings IEEE International Symposium on Computers and Communications*, Jul. 1, 1997, pp. 12-16.

* cited by examiner

METHOD FOR SELECTING AN EDGE SERVER COMPUTER

PRIORITY BENEFIT AND CROSS-REFERENCE TO RELATED APPLICATIONS

This Application is a National Phase Application of International Application No. PCT/EP02/02947, filed Mar. 16, 2002, which application claims priority benefit to European Patent Application No. 01109563.5, filed Apr. 18, 2001, all of which are hereby incorporated by reference.

TECHNICAL FIELD

The present invention relates in general to the field of data communication, and in particular to distributing and streaming of data for accessing digital information, including audio, video and business type information at remotely stored locations, and for communicating that information to a user's premise.

WO 00/29990 discloses a method of servicing requests for delivery of a media content file in a network of client-server computing systems in which a client computer makes an inquiry to an origin server to locate a media server associated with the origin server which stores the media content file, and wherein a local media cache is located within the network at a point near the client. First, the client requests delivery of the media content file by requesting from the origin server the delivery of a media redirection file (MRF) containing a redirection object specifying instructions for obtaining the media content file from the media server. Prior to delivery of the media redirection file to the client, the media redirection file is intercepted and the instructions contained therein are rewritten so that the media content file is obtained from the local media cache by the client instead of from the media server directly.

BACKGROUND INFORMATION

From U.S. Pat. No. 5,734,719, a system for accessing digital information over a computer network is known. The system contains a master server which is situated geographically so as to be accessible to network subscribers. Its geographic and network location is dependent upon communication network systems and subsystem cost and availability in order to best serve a customer's premise, whether it is a retail store or similar point-of-sale or other end-user-location. Security mechanisms that require centralized database authorization prior to the transmission of content and/or the manufacture of any of the products is provided in addition.

New media data extends traditional computer data formats into more natural data formats for the interaction of humans and computers by incorporating images, motion pictures, voice, audio and video. One of the key problems with new media data is transferring the usually huge amounts of content through a network.

A stream server requires all data to be streamed to reside locally on the stream server. The connection bandwidth to the rendering client (media player) has to fulfill at least the requirements corresponding to the nature of the data to be transmitted. For this reason stream servers are placed on so called edge servers (the edge of the network in the connection path to the client; also referred to as the "last mile").

In order to initiate a streaming operation streaming meta data needs to be provided to the renderer client (media player) requesting the stream. The meta data or meta file usually contains at least an identification (key) of the media data to be streamed and the identification of the stream server e.g. the TCP/IP host name of the stream server machine and the port the stream server software listens to.

When a user wants to have media streamed to his client he normally "clicks" on a hyperlink identifying the media on the web page presented to him through his web browser. The web browser generates a http request containing the media identification information. As a response to that the application server sends the media meta data to the client's web browser. Based on that information the web browser typically invokes the corresponding media player which resides on a client and is responsible to receive the meta data from the network, negotiate connection to the stream server, receive and to render the data in parallel.

The way streaming technology is realized today, media players are only able to render streams from a corresponding stream server usually built by the same company. Examples of such charger player, Apple quick time, Microsoft MediaServer/MediaPLayer and Real Networks G2 server/player.

From Mourad a et al: 'scalable web server architectures' proceedings IEEE international symposium on computers and communications, XX, XX, 1 Jul. 1997 (1997-07-01), pages 12-16, XP000199852 it is known to provide more flexibility in load balancing and additional reliability by replication of content on multiple servers. If there is replication of data, a logical file name is mapped to multiple URLs on different servers. In this case, the redirection server has to chose one of the servers containing the relevant data Intelligent strategies for choosing the servers can be implemented to better balance the load among the HTTP servers. It is however a disadvantage of this approach that implementing data replication will require modifying the data structure containing the mapping information.

A common problem of the prior art data transfer protocols, in particular streaming protocols over a computer network, such as the Internet, is the bandwidth required to perform a streaming operation.

SUMMARY OF THE INVENTION

The present invention provides an improved method and computer system for distributing content data to edge servers and in particular, to select an edge server or acceptable alternative edge server which is located topologically nearest to the client which requests the streaming service.

The invention allows an edge server location to which the client is connected while sending the request for streaming to the application server. This determination is done by adding information to the client's http request containing the media identifier on the way to its Web application server which is contacted by the client to select a file for downloading and/or streaming.

Typically the Web application server is contacted by the client by inputting the corresponding uniform resource locator into the client's Web browser program. The connection between the client and the Web application server is provided by establishing a communication path including a plurality of client's Web browser program. The connection between the client and the Web application server is provided by establishing a communication path including a plurality of server computer nodes. The first server computer node in the path from the client to the Web application server is the server topologically closest to the client which can thus be expected to be an efficient edge server to provide the streaming services with the best performance and shortest latency time for the client.

In one embodiment of the invention this server—being the first node in the path from the client to the Web application server—is selected by the Web application server or an associated media request broker to be the server from which the download of the desired file is to be performed. The corresponding Meta data provided from the media request broker to the Web application server to the client contains data identifying the selected server.

In another embodiment, the media request broker contains a file comprising a set of alternative servers being located in the same geographical or topological region as the first server node in the path between the client and the Web application server. In this case, the server from which the download is to be performed is selected from the group comprising the set of servers in the same geographical/topological region as the node itself.

The selection of a particular server out of this group of servers is done based on a determination of a relative quality weight index of the server in the group. The relative quality weight can be determined based on one or more of the following criteria: availability of the desired media on the server, number of transactions in process, usage of processing resources and available bandwidth in the communication path to the client.

In another embodiment, the other server computers in the path from the client to the Web application server are also taken into consideration for the selection of the particular server. In addition, each of these additional servers can also have associated regional servers which can also be taken into consideration for determining an appropriate server to perform the download and/or streaming operation.

In another embodiment, a server computer can contain stream servers of different data formats. If a media is available on that server computer in a format which is different to the format required by the requesting client, this server computer can still be selected to be the server computer of choice. In this case, the data format available on the server computer is transcoded "on the fly" to the desired format and then streamed to the client.

A particular field of application of the present invention is mobile communication, in particular with respect to digital telephony such as UMTS. In this case the client can be any mobile device, such as a mobile phone having an integrated MP3 player, a personal digital assistant or a portable computer, such as a Laptop or Palm top computer, having a wireless interface.

An advantage of the present invention is that by selecting a server based on its quality weight, the computer network can be balanced as far as the distribution of computing and/or bandwidth resources is concerned. The overall system throughput can thereby be optimized.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The present invention is illustrated by way of example and is not limited by the figures of the accompanying drawings in which.

DETAILED DESCRIPTION

In the following description, numerous specific details are set forth such as specific network configurations, etc. to provide a thorough understanding of the present invention. However, it will be obvious to those skilled in the art that the present invention may be practiced without such specific details. In other instances, well known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
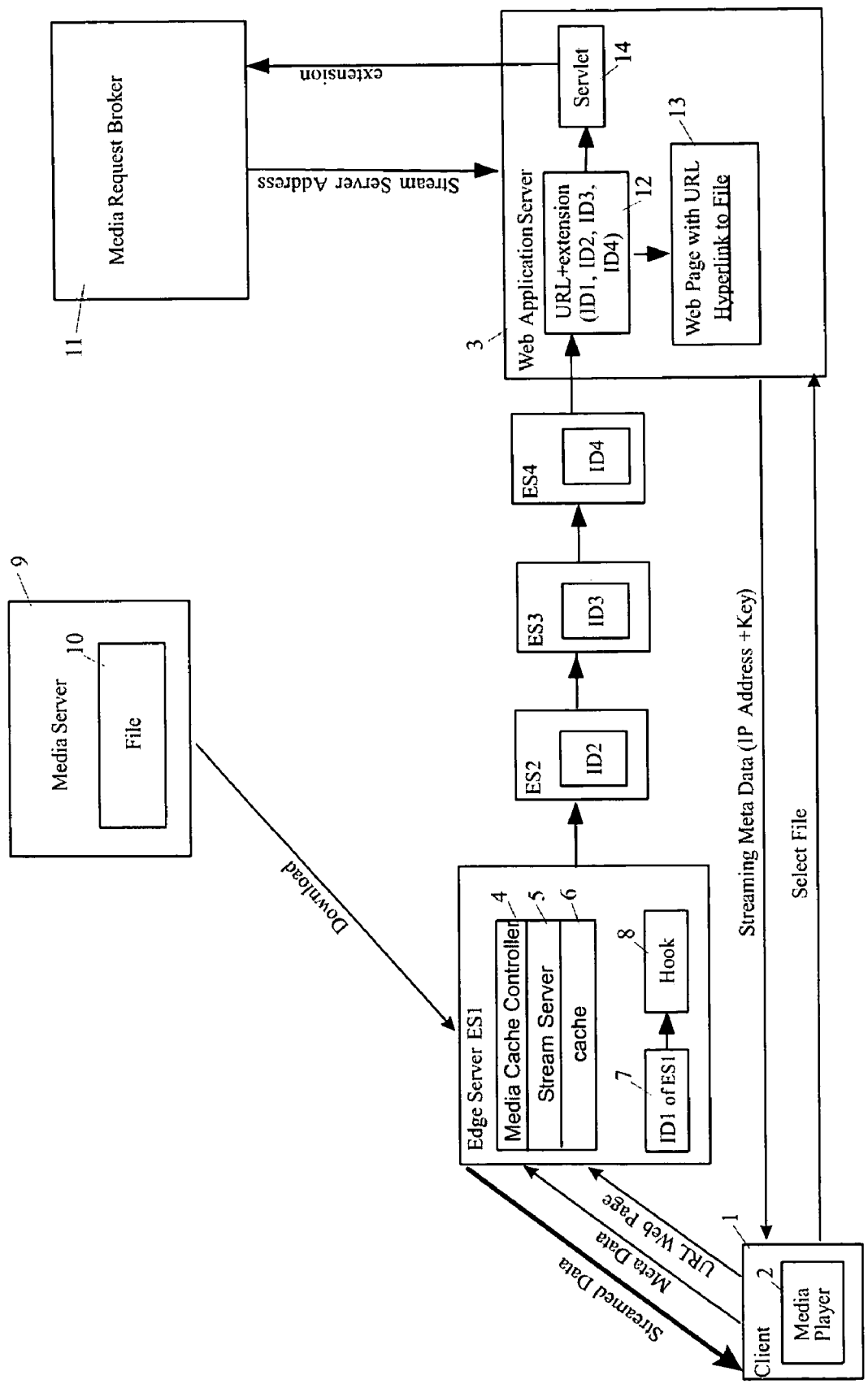
FIG. 1 is a block diagram of a first embodiment of a computer system of the invention.

The computer system of FIG. 1 has a client 1. The client 1 has a web browser and a media player 2, for example and IBM Video charger player.

The client 1 can connect with the help of his web browser to Web application server 3 via a computer network, such as the Internet comprising the edge servers ES1, ES2, ES3, ES4 and other edge servers not shown in FIG. 1. The edge server ES1 has a media cache controller 4, stream server 5 and cache 6.

The stream server 5 can be an IBM Video charger to interface with the corresponding media player 2 of client 1. The streaming operation is performed out of the cache 6. The media cache controller 4 controls and analyzes the status and operation of stream server 5 and its cache 6.

In particular media cache controller 4 evaluates a present system status to provide a quality weight indicating the loading of the system. The quality weight can include one or more of the following criteria: availability of the selected file in the cache 6, available bandwidth for connecting to the client 1, percentage of processing resources of the edge server ES1 and/or other criteria.

Further the edge server ES1 has a memory 7 for storage of the identifier ID1 of the edge server ES1. Hook 8 is coupled to the memory 7.

Each of the edge servers passes the http requests and responses of the client and the web application server back and forth. For every http request coming from the client the edge server calls the hook 8 and passes this http request to it.

The hook 8 exams this http request for a unique signature which identifies the request as a media request. If the hook 8 identifies this signature, it appends its identifier ID1 to the http request and passes the request back to the edge server ES1 The edge server ES1 sends it to the next edge server ES2 ... ESn—if there is one—or to the application server 3.

The further edge servers ES2, ES3 and ES4 in the communication path between the client 1 and the Web application server 3 are of the same or a similar constitution than edge server ES1.

The computer system of FIG. 1 further includes media server 9 which stores the selected media 10. Media server 9 can be coupled to anyone of the edge servers ES1 to ES4 for downloading the media 10 to the corresponding edge server.

Web application server 3 is coupled to media request broker 11. The media request broker 11 selects one of the edge servers ES1 to ES4 or another edge server to perform the streaming operation of the desired data to client 1. Based on this selection of a server by media request broker 11 the Web application server generates the Meta data for the client 1.

The Web application server has a memory 12 for at least temporarily storing the http request of the client augmented by data indicative of one or more of the edge servers comprised in the communication path between the client 1 and the Web application server 3.

The Web application server further contains servlet 14 which is invoked through this http request when client 1 clicks on the Hyperlink to a media 10.

In operation, client 1 clicks on a hyperlink within a Web page 13 in its Web browser program in order to request the desired media from the Web application server 3 via the Internet. As already explained in detail above, the web browser generates the corresponding http request, which is routed through the edge servers ES1 to ES4 such that a communication path including those edge servers results.

As the communication path is built up, the hook 8 of edge server ES1 adds information to the http request to add its identifier ID1 to the request. Likewise, the further edge servers ES2 to ES4 also append corresponding data to the http request.

Thus the resulting http request is composed of the original URL plus data indicative of the identifiers ID1 to ID4.

Subsequently servlet 14 is invoked with all the information contained within the client's http request and it transfers at least the extension to the media request broker 11.

The media request broker has a variety of options to select an appropriate edge server as a server for streaming of the desired file 10 to client 1. One option is to select the edge server ES1 as the edge server which is closest to the client 1 in the communication path which has been established through the Internet to the Web application server 3.

It is assumed that the closest edge server ES1 also provides highest bandwidth. The identity of the edge server ES1 is determined by the media request broker by analyzing the appended extension provided by the hook running on each edge server ES1 to ESn.

Based on this information the media request broker 11 generates the Meta data which is required by client 1 to access a stream server. The Meta data includes the complete Network address of stream server 5 (e.g. IP-address and port) and a key for access to the desired media 10 is provided to client 1 by Web application server 3.

In response to receipt of the Meta data the client 1 connects to the edge server ES1, in particular to stream server 5, to invoke the streaming operation. In case the desired media 10 is already available in the cache 6 the streaming can start immediately.

If this is not the case first a download operation of the file 10 from the media server 9 to the cache 6 of the edge server ES1 needs to be initiated.

Alternatively the Media request broker can also take into consideration the further edge servers ES2 to ES4 as identified by the extension provided by Servlet 14. In either case Media request broker 11 evaluates the quality weights provided by the Media cache controllers 4 of the corresponding edge servers ES1 to ES4 to select the most suitable edge server.

For example, the edge server ES2 may already contain the media 10 in its cache 6 while the media 10 is not available in the cache 6 of the edge server ES1. In this case, the quality weight of the edge server ES2 is greater than the quality weight of the edge server ES1 even though the edge server ES1 is closer to client 1 due to the fact that the edge server ES2 already has the required data.

Likewise edge server ES2 or another edge server can be selected by the Media request broker for other reasons, for example the edge server ES1 being overloaded, the stream server 5 of the edge server ES1 being down or not having the required data format.

Figure 2:
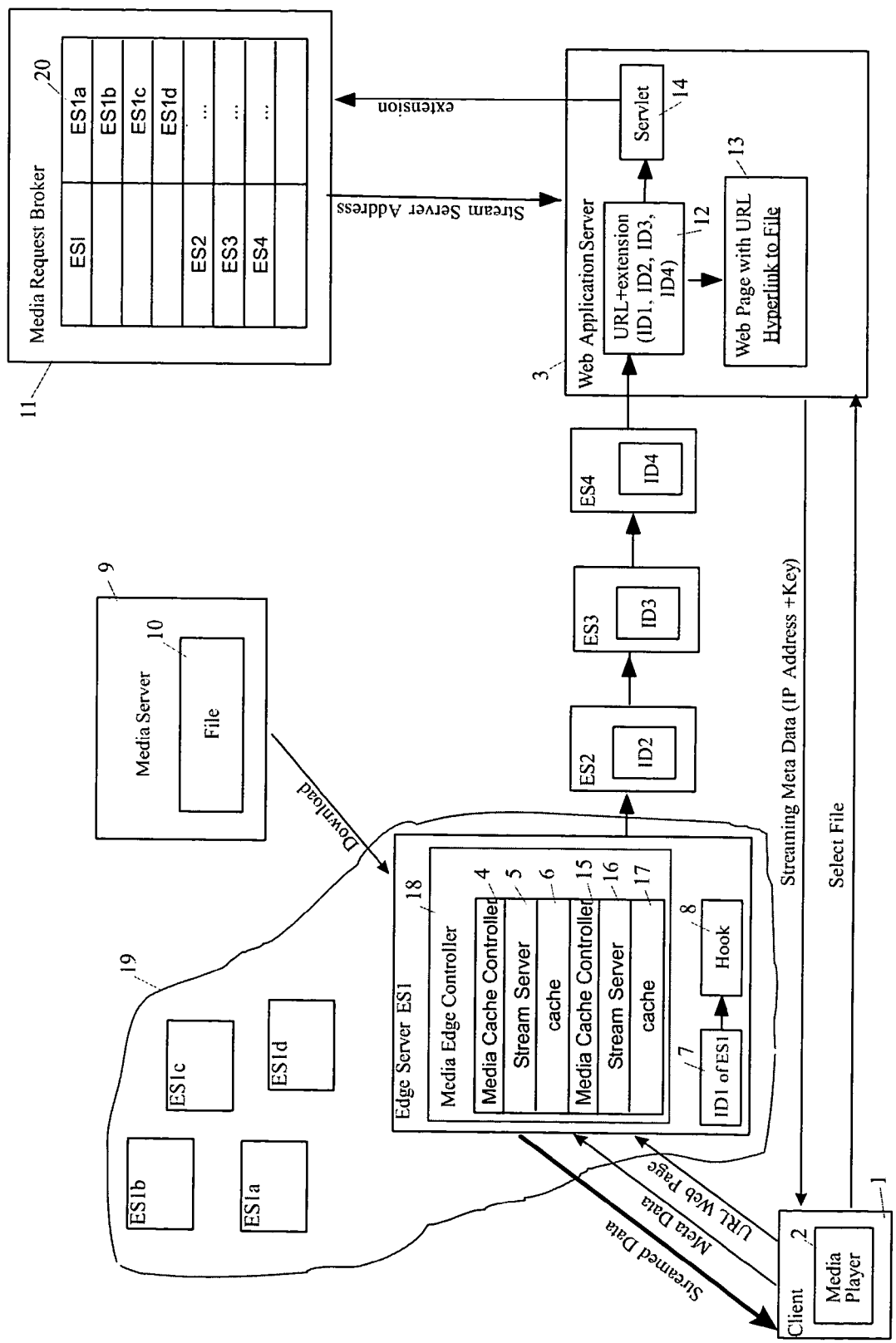
FIG. 2 is a block diagram of a second embodiment of a computer system of the invention.

FIG. 2 shows another embodiment of the invention wherein like elements are denoted by the same reference numerals. The edge server ES1 of the computer system of FIG. 2 has an additional media cache controller 15, stream server 16 and cache 17. The stream server 16 is capable of streaming a different format than stream server 5. Again, edge server ES1 has memory 7 and hook 8.

As in the previous embodiment hook 8 serves to provide an extension to the http request provided by the client 1 to append information indicative of the identifier ID1 of the edge server ES1.

On a second level of hierarchy the edge server ES1 has a media edge controller 18 which communicates with the media cache controllers 4 and 15 of the individual stream servers 5 and 16.

Further the computer system comprises the edge servers ES1a, ES1b, ES1c and ES1d which are located in the same geographical/topological region or area 19 of the edge server ES1. Likewise the other edge servers ES2 to ES4 can be associated to corresponding additional edge servers in their respective regions or areas.

This situation is reflected by the database 20 stored by the media request broker 11. The database 20 groups edge servers of each of the regions or areas; for example in case of the region 19 it assigns the edge server ES1 to the additional edge servers ES1a to ES1d. The database 20 can contain similar entries for the further edge servers ES2 to ES4.

When the media request broker 11 obtains the extension from servlet 14 it identifies the first edge server in the path between client 1 and Web application server 3—which is the edge server ES1. In the next step media request broker 11 identifies the additional edge servers ES1a to ES1d being located in the same geographical/topological region 19 of the edge server ES1 by querying database 20.

Further the media request broker 11 obtains the relative quality weights from the media cache controllers and/or media edge controllers of the respective group of edge servers of the region 19. The media request broker 11 selects the stream server providing the highest quality weight from this group of edge servers.

If the highest quality weight of a stream server of this group of edge servers is not sufficient, for example because it is below a predefined threshold value, the media request broker 11 performs an equivalent operation for the next edge server ES2 and the associated regional group of additional edge servers not shown in FIG. 2 to search for a stream server having a sufficient quality weight.

As a result of this process the media request broker 11 returns a stream server address to the Web application server 3 based on which the meta data for client 1 is generated.

In the embodiment of the FIG. 2 it is also possible for media request broker 11 to select—for example—Edge Server ES1 with stream server 16 even though the actual media to be streamed is only residing in the cache of stream server 5 in the format of stream server 5 which is not compatible to the format necessary for media player 2 at the client. This is due to the fact that the edge server ES1 has a transcoder program for transcoding the data provided by stream server 16 into the required format of the media player 2.

The transcoding is initiated by media request broker with a corresponding message to the media edge controller. In the example the requested media taken from the cache of Stream Server 16 is transcoded and the resulting media is stored in the cache of Stream Server 5. Subsequently a meta file is generated pointing to stream server 5 and the media would be streamed from stream server 5 to the media player.

Figure 3:
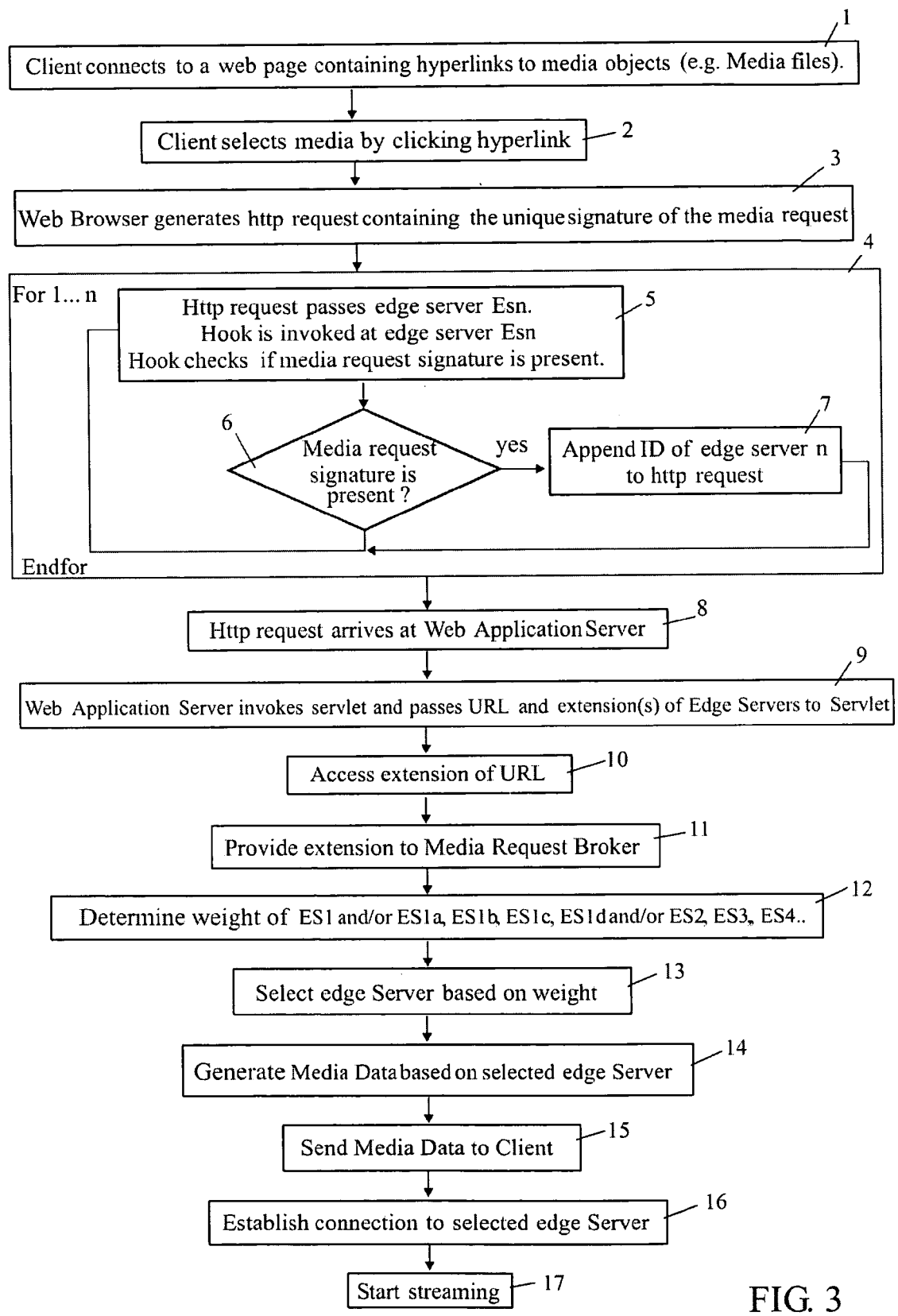
FIG. 3 is an embodiment of a method of the invention.

FIG. 3 illustrates a method of the invention. In step 1, a client connects to a web page containing hyperlinks to media objects (e.g., Media files). In step 2, the client selects a media by clicking an associated hyperlink.

In step 3 a Web Browser generates a http request containing the unique signature of the media request.

Step 4 is a for-next-loop containing the following steps 5, 6 and 7:

For all edge servers 1 to n:
Pass Http request to edge server ESm.
Invoke hook at edge server ESm.
Check hook if media request signature is present. (Step 5)

In step 6 it is decided if a media request signature is present. If this is the case an ID of the edge server ESm is appended to the http request in step 7 and the control goes back to step 5 with an incremented m. Otherwise m is incremented directly and the control goes back to step 5 as long as m remains lesser or equal to n.

In step 8 the Http request arrives at the Web Application Server. Next in step 9 the Web Application Server invokes a servlet and passes a URL and the extension(s) of the Edge Servers to the Servlet.

The extension of the URL is accessed in step 10 by the servlet to provide the extension to the media request broker in step 11.

Based on the extension the media request broker determines quality weights of potential edge servers in step 12. A potential edge server is the first edge server in the communication path between the client and the Web page—which is edge server ES1—or an edge server from a regional group of the edge server ES1 and/or one of the edge servers ES2 to ES4 and/or corresponding regional groups of the edge servers ES2 to ES4.

In step 13 the media request broker selects an appropriate edge server based on the quality weight as determined in step 12.

Based on the selected edge server, corresponding media data is generated in step 14 which is sent to the client in step 15.

The client connects to the edge server indicated in the meta data and provides the key to the edge server to initiate the streaming in step 16. The streaming starts in step 17.

Although the present invention and its advantages have been described in detail, it should be understood that various changes, substitutions and alterations can be made herein without departing from the spirit and scope of the invention as defined by the appended claims.

The invention claimed is:

1. A method for selecting a first server computer for sending of data to a client computer, the method comprising the steps of:

accessing a second server computer through a path in a computer network, the path comprising a first set of one or more server computers;

adding information indicative of at least one server computer of the first set of one or more server computers to a locator of a resource on the second server computer, the resource having a unique signature as part of its identifier;

selecting the first server computer based on the information added to the locator;

wherein the second server computer being a Web application server comprising a Web page with a hyperlink referencing the data to be sent to the client computer, the hyperlink including a unique signature, the method further comprising the steps of selecting the hyperlink by the client computer, and subsequently generating an http request out of this hyperlink by a web browser, this http request containing the unique signature identifying a media request;

at least temporarily storing the information added to the locator on the second server computer;

providing of the information to a media request broker in response to a selection of the hyperlink by the client computer;

providing the media request broker with the information, the information being indicative of the server computer of the first set of one or more server computers being a first node in the path;

determining a quality weight based on the information for the first server computer node in the path and for server computers of a second set of server computers belonging to that server computer node;

selecting one of the server computers from a group comprising the first server computer node in the path and the second set of server computers with a quality weight being greater than a predefined threshold value; and determining a quality weight of a second server computer node in the path in case none of the quality weights of the first group is sufficient.

2. The method of claim 1, the quality weights being determined based on one or more following criteria: availability of the data on a server computer, number of transactions in process on the server computer, percentage of processing resources in use on the server computer, communication bandwidth available in a communication link with the client.

* * * * *